US007823056B1

(12) United States Patent
Davey et al.

(10) Patent No.: US 7,823,056 B1
(45) Date of Patent: Oct. 26, 2010

(54) MULTIPLE-CAMERA VIDEO RECORDING

(75) Inventors: Matthew Davey, Groton, MA (US); David Kuspa, San Jose, CA (US); Steven Warner, Sunnyvale, CA (US); Michael Gregory Jennings, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1210 days.

(21) Appl. No.: 11/429,134

(22) Filed: May 4, 2006

Related U.S. Application Data

(63) Continuation-in-part of application No. 11/377,885, filed on Mar. 15, 2006.

(51) Int. Cl.
*G06F 3/00* (2006.01)
(52) U.S. Cl. .................................. 715/202; 715/723
(58) Field of Classification Search .................. 715/216, 715/723
See application file for complete search history.

(56) References Cited

U.S. PATENT DOCUMENTS

| | | | | |
|---|---|---|---|---|
| 5,187,571 A * | 2/1993 | Braun et al. | .................. | 348/39 |
| 5,206,929 A * | 4/1993 | Langford et al. | ............ | 715/723 |
| 5,442,744 A | 8/1995 | Piech et al. | | |
| 5,598,208 A * | 1/1997 | McClintock | ................ | 348/159 |
| 5,613,032 A * | 3/1997 | Cruz et al. | .................... | 386/69 |
| 5,732,184 A | 3/1998 | Chao et al. | | |
| 5,737,552 A * | 4/1998 | Lavallee et al. | ............. | 715/720 |
| 5,760,767 A * | 6/1998 | Shore et al. | ................. | 715/723 |
| 5,781,188 A | 7/1998 | Amiot et al. | | |
| 6,243,085 B1 * | 6/2001 | Roach | ........................ | 715/202 |
| 6,253,461 B1 | 7/2001 | Fischer | | |
| 6,317,166 B1 * | 11/2001 | McCutchen | ................ | 348/722 |
| 6,324,335 B1 | 11/2001 | Kanda | | |
| 6,351,765 B1 | 2/2002 | Pietropaolo et al. | | |
| 6,353,461 B1 * | 3/2002 | Shore et al. | ................. | 348/722 |
| 6,452,612 B1 * | 9/2002 | Holtz et al. | ................. | 715/723 |
| 6,459,711 B1 | 10/2002 | Hamaguchi et al. | | |
| 6,621,503 B1 * | 9/2003 | Ubillos | ....................... | 715/723 |
| 6,670,966 B1 | 12/2003 | Kusanagi | | |

(Continued)

OTHER PUBLICATIONS

Monohan, Avid Xpress Pro for Windows and Macintosh: Visual QuickPro Guide, Published Nov. 18, 2003, Peachpit Press, pp. 206-208.*

(Continued)

*Primary Examiner*—Doug Hutton
*Assistant Examiner*—Frank D Mills
(74) *Attorney, Agent, or Firm*—Fish & Richardson P.C.

(57) ABSTRACT

Techniques and systems for recording video and audio in timeline sequences. In some embodiments, a method involves playing video from a timeline sequence that can include footage from portions of video tracks including at least one pre-recorded edit. In response to a selection of footage from the timeline sequence, the method can involve overwriting at least one pre-recorded edit in the timeline sequence. Each video track can correspond to a respective camera in a multiple-camera source. The footage can include one or more video clips, still images, frames, and moving images. The overwriting can occur while playing the video at a play rate faster than realtime, a play rate slower than realtime, a user-selected playing rate, during video scrubbing, or during realtime playback. The recording may involve a jump back input, and punch in and punch out locations associated with the timeline sequence.

22 Claims, 10 Drawing Sheets

U.S. PATENT DOCUMENTS

| | | | |
|---|---|---|---|
| 6,675,386 | B1 | 1/2004 | Hendricks et al. |
| 6,699,127 | B1* | 3/2004 | Lobb et al. ............ 463/43 |
| 6,763,177 | B1* | 7/2004 | Abe et al. ............ 386/55 |
| 7,024,677 | B1* | 4/2006 | Snyder et al. ............ 725/86 |
| 7,037,127 | B2 | 5/2006 | Williams |
| 7,055,100 | B2 | 5/2006 | Moriwake et al. |
| 7,073,127 | B2 | 7/2006 | Zhao et al. |
| 7,124,366 | B2 | 10/2006 | Foreman et al. |
| 7,196,722 | B2 | 3/2007 | White et al. |
| 7,199,817 | B2 | 4/2007 | Mottur et al. |
| 7,325,199 | B1 | 1/2008 | Reid |
| 7,356,242 | B2 | 4/2008 | Nagasawa |
| 7,428,002 | B2 | 9/2008 | Monroe |
| 2001/0036356 | A1* | 11/2001 | Weaver et al. ............ 386/52 |
| 2001/0040592 | A1 | 11/2001 | Foreman et al. |
| 2002/0133827 | A1* | 9/2002 | Newnam et al. ............ 725/89 |
| 2002/0196329 | A1* | 12/2002 | Dudkowski ............ 348/48 |
| 2003/0002851 | A1 | 1/2003 | Hsiao et al. |
| 2003/0039471 | A1* | 2/2003 | Hashimoto ............ 386/111 |
| 2003/0077071 | A1* | 4/2003 | Lin et al. ............ 386/68 |
| 2003/0197785 | A1* | 10/2003 | White et al. ............ 348/207.99 |
| 2003/0215214 | A1* | 11/2003 | Ma ............ 386/52 |
| 2004/0042103 | A1* | 3/2004 | Mayer ............ 360/7 |
| 2004/0047208 | A1* | 3/2004 | Hoddie et al. ............ 365/202 |
| 2004/0066457 | A1 | 4/2004 | Silverstein et al. |
| 2004/0080624 | A1 | 4/2004 | Yuen |
| 2005/0034076 | A1 | 2/2005 | Belhumeur et al. |
| 2005/0094966 | A1* | 5/2005 | Elberbaum ............ 386/46 |
| 2005/0206720 | A1* | 9/2005 | Cheatle et al. ............ 348/14.08 |
| 2005/0285943 | A1 | 12/2005 | Cutler |
| 2006/0104601 | A1* | 5/2006 | Arora et al. ............ 386/46 |
| 2006/0171453 | A1 | 8/2006 | Rohlfing et al. |
| 2006/0279628 | A1* | 12/2006 | Fleming ............ 348/143 |
| 2006/0288288 | A1* | 12/2006 | Girgensohn et al. ............ 715/716 |
| 2007/0113182 | A1* | 5/2007 | Hollemans ............ 715/723 |
| 2007/0183768 | A1 | 8/2007 | Mottur et al. |
| 2007/0201815 | A1* | 8/2007 | Griffin ............ 386/52 |
| 2008/0019576 | A1 | 1/2008 | Senftner et al. |
| 2008/0044155 | A1* | 2/2008 | Kuspa ............ 386/52 |

OTHER PUBLICATIONS

Monohan, Avid Xpress Pro for Windows and Macintosh: Visual Quickpro Guide, p. 119-122 (Peachpit Press, Nov. 18, 2003).*

Group Clip Editing, Chapter 18, 11 pages.

Hot Shots with Premiere Pro 2.0: Multicam Editing, Tutorial Series, Part 2; 2 pages.

Peter Wiggins Reviews Multicam Lite, Creativecow.net Product Review; United Kingdom; Internet: http://www.creativecow.net/articles/wiggins_peter/multicam_rev/; (1 of 16) Nov. 24, 2005 11:10:43 AM.

Working With Multiclips, Chapter 16, pp. 247-288.

"Group Clip Editing," Chapter 18 in *The Avid User Manual*, 11 pages (accessed on Mar. 8, 2006).

"Hot Shots with Premiere Pro 2.0: Multicam Editing, Tutorial Series Part 2," http://ads.digitalmedianet.com/ads/servelet/click/zone?zid=117&pid=0&lookup=true&position-1 6 pages, (accessed Feb. 22, 2006).

"Multicam Features," http://www.unitedmediainc.com/multicam, 2 pages, (accessed on Jan. 10, 2006).

White, Charlie, "Hot Shots with Premiere Pro 2.0: Multicam Editing, Tutorial Series, Part 2," http://www.digitalvideoediting.com/articles/viewarticle.jsp?id-=36989, 9 pages, (accessed on Feb. 22, 2006).

"Hot Shots with Premiere Pro 2.0: Multicam Editing, Tutorial Series Part 2," http://ads.digitalmedianet.com/ads/servlet/click/zone?zid=117&pid=0&lookup=true&position=1, 2 pages, (accessed on Apr. 4, 2006).

"Avid NewsCutter Adrenaline FX," http://www.virtualmediaonline.com/products/Newscutter%20Adrenaline%20Overview.html, 67 pages, (accessed on Apr. 4, 2006).

Dunn, USPTO Office Action in U.S. Appl. No. 11/506,389, mailed Jun. 26, 2008, to be published by USPTO as part of the file history, 8 pages.

Dunn, USPTO Office Action in U.S. Appl. No. 11/506,389, mailed Mar. 9, 2009, to be published by USPTO as part of the file history, 10 pages.

Media 100—Advanced Editing Systems, available at: http://www.mwdia100.com/products/php, printed on Jul. 9, 2009.

Stitt, USPTO Office Action in U.S. Appl. No. 11/377,885, mailed Jul. 9, 2008, to be published by USPTO as part of the file history, 16 pages.

Stitt, USPTO Office Action in U.S. Appl. No. 11/377,885, mailed Jan. 14, 2009, to be published by USPTO as part of the file history, 17 pages.

Stitt, USPTO Office Action in U.S. Appl. No. 11/377,885, mailed Apr. 29, 2009, to be published by USPTO as part of the file history, 16 pages.

Tran, International Search Report, Application Serial No. PCT/US07/76155, dated Sep. 22, 2008, 8 pages.

Stitt, USPTO Office Action in U.S. Appl. No. 11/377,885, mailed Nov. 9, 2009, to be published by USPTO as part of the file history, 20 pages.

* cited by examiner

MULTIPLE-CAMERA VIDEO RECORDING

CROSS-REFERENCE TO RELATED APPLICATIONS

This application is a continuation-in-part application of, and claims priority to, U.S. patent application Ser. No. 11/377,885, entitled "MULTIPLE-CAMERA VIDEO EDITING TECHNIQUE," to inventors MATTHEW DAVEY, DAVID KUSPA, AND STEVEN WARNER, which was filed on Mar. 15, 2006. The disclosure of the above application is incorporated herein by reference in its entirety.

BACKGROUND

The present disclosure relates to video recording techniques using video sources from multiple cameras. Multiple-camera video recording involves the synchronizing and editing of video of an event recorded from multiple cameras simultaneously. The multiple cameras are typically at different locations and can record the event from a different perspective, angle, or with a different audio source. A multiple-camera setup can be used to shoot most studio-produced television programs such as situation comedies, soap operas, news programs, game shows, talk shows, or events, such as ceremonies, athletic games, community events and musical performances. In recording a wedding event, for example, a first camera may be recording the event from the perspective of a bride and groom, a second camera may be recording the event from a perspective of a musician, a third camera may be recording the event from a perspective of a wedding administrator, and a fourth camera may be recording the event from a perspective of a wider, master shot to capture the overall action and establish the geography of the room. Traditionally, each camera had the recording on a tape, the recorded footage from the tapes were synchronized, and then edited on a master recording. Today, the recording and editing is often performed digitally, and the source footage from a clip from each camera can be selected and combined into a single, fixed video clip and saved on a computer storage medium.

SUMMARY

In general, in some aspects, the disclosure features techniques and products for recording in timeline sequences for multiple-camera video sources. Some aspects feature a computer program product, encoded on a computer-readable medium, operable to cause data processing apparatus to perform operations including playing video from a timeline sequence, in which the timeline sequence includes footage from portions of video tracks, and each video track corresponds to a respective camera in a multiple-camera source. The timeline sequence includes at least one pre-recorded edit. The operations also include, in response to a selection associated with the multiple-camera source, overwriting at least one pre-recorded edit in the timeline sequence, in which the overwriting occurs while the video from the timeline sequence is playing.

Advantageous embodiments of the disclosure include one or more of the following features. The operations can involve concurrently presenting video from the timeline sequence and each of the video tracks in a distinct monitor from multiple monitors. The selection associated with the multiple-camera source can include a selection of at least one monitor corresponding to a video track to overwrite the at least one pre-recorded edit in the timeline sequence. The overwriting can occur while playing the video in realtime, at a play rate faster than realtime, a play rate slower than realtime, a user-selected play rate, or during video scrubbing. The selection associated with the multiple-camera source can include a selection of an overwrite selector to enable or disable overwriting.

The operations can also include presenting a preview mode in a graphical user interface for displaying the timeline sequence when the overwrite selector disables overwriting. The overwriting can involve overwriting at least one pre-recorded edit in the timeline sequence in response to the playing video reaching a punch-in location on the timeline sequence. The overwriting can also involve stopping the overwriting in response to the playing video reaching a punch-out location on the timeline sequence. The operations can include displaying a preview mode in a graphical user interface for the playing video corresponding to the punch-in and punch-out locations.

The playing can involve playing video from a target timeline sequence that includes video footage and a target video track, in which the target video track can include a source video timeline sequence with the video tracks corresponding to respective cameras in a multiple-camera source. The footage can include one or more video clips. The selection associated with the multiple-camera source can include a selection of footage from at least one of the cameras in the multiple-camera source. The operations can also include, in response to a selection of a jump back input, rewinding the playing video a pre-defined amount of time or frames. The rewinding the playing video can provide an option or opportunity to re-overwrite at least one pre-recorded edit in the timeline sequence. The rewinding can involve positioning the playing the video at a location before at least one pre-recorded edit in the timeline sequence. The playing of the video can resume immediately after the rewinding at the rewound location in the timeline sequence.

In another general aspect, the techniques feature a system or software product that includes a graphical user interface configured to present a first video track, a first timeline sequence, and a second timeline sequence. The first video track includes a first footage. The first timeline sequence includes at least some portions from a first set of video tracks, in which the first set of video tracks includes at least some portions of the first footage and footage from multiple video tracks other than the first footage. The second timeline sequence includes at least some portions from a second set of video tracks, in which the second set of video tracks includes at least some portions of the first timeline sequence. The system or software product also includes multiple monitors in the graphical user interface configured to concurrently display footage for any of the video tracks and timeline sequences. At least one video track in at least the first timeline sequence corresponds to a distinct monitor from the multiple monitors, and at least one video track in at least the first set of video tracks corresponds with footage from a distinct camera in a multiple-camera video source. The system or software product also includes a monitor selector configured to select a monitor playing video associated with a video track in a group that includes the first video track, the first set of video tracks, or the second set of video tracks to overwrite pre-recorded edits from at least some portions of any of the timeline sequences playing in at least one of the multiple monitors.

Advantageous implementations can include one or more of the following features. At least one monitor can be configured to display a preview of potential overwrites of the pre-recorded edits. The system or software product can be further configured to display video in a preview mode in at least one monitor in the graphical user interface for punch-in and punch-out locations in at least one of the timeline sequences. The punch-in locations can represent locations where the system or software product is configured to overwrite the pre-recorded edits in the first or second timeline sequence when the video playing reaches the punch-in location on the first or second timeline sequence. The punch-out locations can represent locations where the system or software product is configured to end the overwriting of the pre-recorded edits in the first or second timeline sequence when the video playing reaches the punch-out location on the first or second timeline sequence. The system or software product can include a recording selector to overwrite pre-recorded edits from at least some portions of any of the timeline sequences. When the recording selector is enabled, the recording selector can be configured to create an edit location in at least one of the timeline sequences that is playing, in which the video in the at least one of the timeline sequences can be overwritten at the edit location with footage from a selected monitor. The system or software product can also include a jump back input to rewind the video playing a predetermined amount of time or frames to provide an option to re-overwrite the pre-recorded edits in at least one timeline sequence. The rewinding can involve positioning the playing video at a location before at least one pre-recorded edit in at least one timeline sequence.

In another general aspect, the techniques feature a method of recording video that includes playing video from a timeline sequence, in which the timeline sequence includes footage from portions of video tracks, and the timeline sequence also includes at least one pre-recorded edit. In response to a selection of footage from the timeline sequence, the method includes overwriting at least one pre-recorded edit in the timeline sequence, in which the overwriting occurs while the video in the timeline sequence is playing.

Advantageous implementations can include one or more of the following features. The overwriting can include overwriting while playing the video at a play rate faster than realtime, a play rate slower than realtime, a user-selected playing rate, during video scrubbing, or during realtime playback. In response to selecting a jump back input, the video playing can be rewound a pre-defined amount of time or frames. The rewinding of the video a pre-defined amount of time or frames can provide an option to re-overwrite the pre-recorded edits in the timeline sequence, in which the rewinding can involve positioning the playing video at a location before at least one pre-recorded edit in the timeline sequence. The playing of the video can resume immediately after the rewinding at the rewound location in the timeline sequence. The selecting can include a selection of at least one monitor corresponding to a video track to overwrite the pre-recorded edits in the timeline sequence. The method can also include displaying the playing video in a preview mode in a graphical user interface that corresponds to punch-in and punch-out locations, overwriting at least one pre-recorded edit in the timeline sequence when the playing video reaches the punch-in location on the timeline sequence, and stopping the overwriting of at least one pre-recorded edit in the timeline sequence when the playing video reaches the punch-out location on the timeline sequence.

Particular embodiments of the disclosure can be implemented to realize one or more of the following advantages. There can be multiple tracks of video clips in a timeline sequence, in which each track includes video clips from a respective camera. In other words, the timeline sequence can serve as a container for all or portions of one or more tracks, and each track can serve as a container for all or portions of one or more of the clips. Each video clip can have a corresponding audio clip, and each video track can have a corresponding audio track.

The disclosure can include a control panel for a digital video system that can provide a familiar recording metaphor, such as a control for a video tape recorder. The disclosure can provide advantages over traditional video tape recording in that the recording can be performed digitally, in software, and video clips can be arranged in a non-linear fashion from the source or destination. Users can be allowed to preview video footage that can be recorded onto the track or timeline sequence. Video footage on a track or timeline sequence can be overwritten, so that existing edits can be overwritten without requiring a manual adjustment of the video clips or a removal of the pre-existing edits. A user can make edits on a track on a first pass during playback, rewind to or past an edit point on the track, and re-record on the track to overwrite the edit point with footage from another video source. The edit point can be located between two clips on a track.

Other advantages of the disclosure can offer overwriting the video on a track to use different camera angles, changing the timing of the switching between camera angles, or extending or shortening a length of the video clips in a track without requiring manual edit techniques, such as removing an edit point, making a rolling edit adjustment to slide the edit point forward or backward in time, deleting unwanted camera angle clips, or extending clips to fill in gaps that were created from the deletion of adjacent clips. At anytime during the playback of the video, the user can "punch in" to start overwriting and "punch out" to stop overwriting, and then play back the edits made during the punch-in, punch-out segment.

The overwriting of the pre-recorded edit can occur while playing the video at a play rate that is faster than realtime, a play rate that is slower than realtime, a user-selected playing rate, during video scrubbing, or during realtime playback. The overwriting can occur in any number of video clips in a video track, and for any number of video tracks in a timeline sequence. In some embodiments, the overwriting can occur in a first timeline sequence that is nested within a track of a second timeline sequence. In some embodiments, the overwriting can occur for video associated with multiple-camera sources, while in other embodiments overwriting can occur for video not associated with multiple-camera sources.

The details of one or more embodiments of the disclosure are set forth in the accompanying drawings and the description below. Other features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
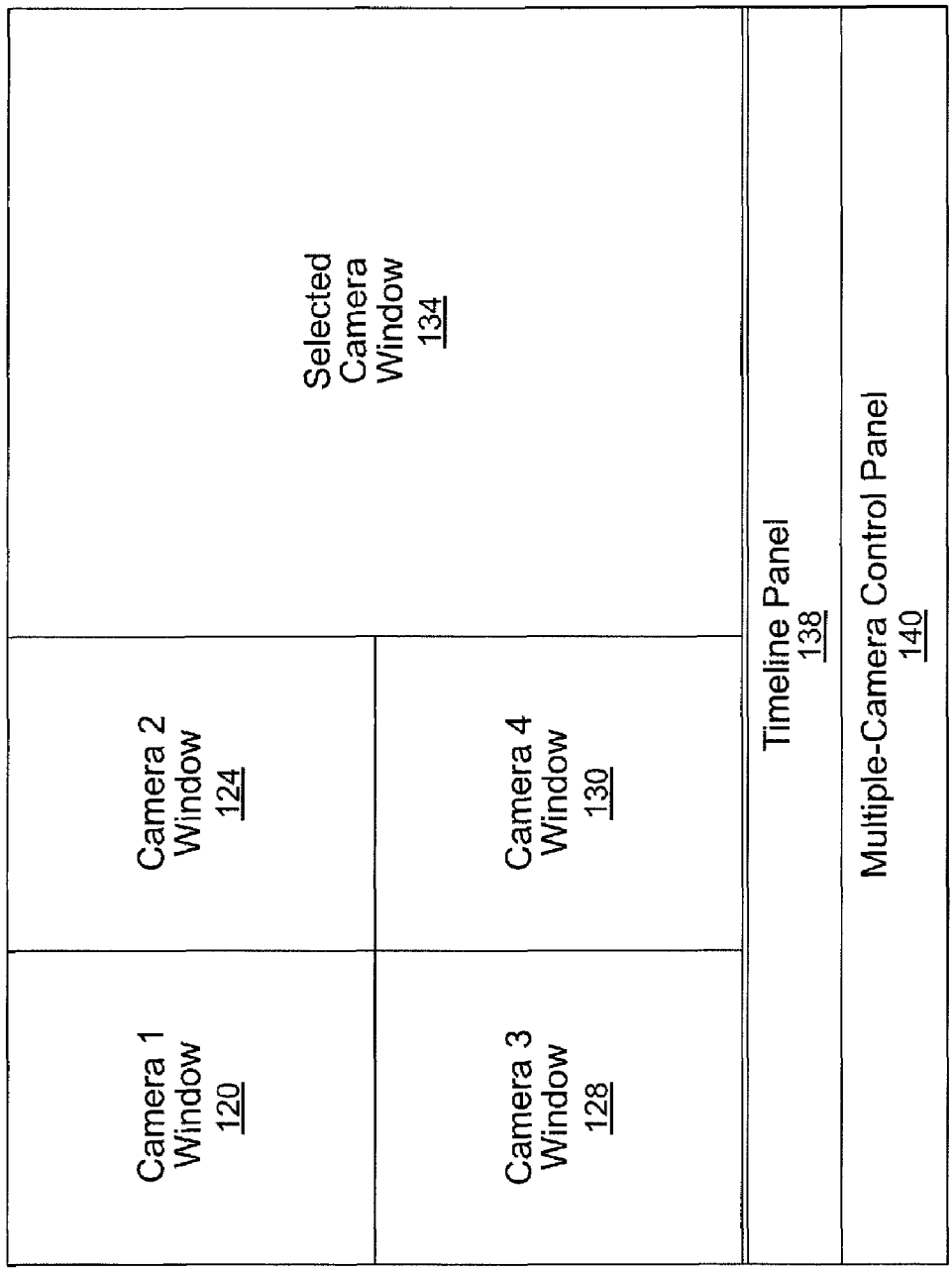
FIG. 1 shows an example multiple-camera monitor.

In some embodiments, a user of a system or software program can assemble various clips into one or more tracks of video and audio corresponding to the video. All or portions of any of the multiple tracks can be used to generate a first (source) timeline sequence of video or audio. All or portions of the source timeline sequence can be inserted into at least one track of a second (target) timeline sequence. The insertion of the source timeline sequence into a track of the target timeline sequence can be referred to as "embedding" or "nesting" the source timeline sequence into the target timeline sequence. The target timeline sequence can be generated from all or portions of any of the multiple, target tracks.

In some embodiments, the embedding/nesting can refer to inserting and including the source timeline sequence into a target track of the target timeline sequence. In other embodiments, the embedding/nesting can refer to pointing, mapping, linking, or referring to the source timeline sequence from the target track of the target timeline sequence. In other words, the target track of the target timeline sequence can point to or refer to the source timeline sequence instead of having the audio/video footage of the source timeline sequence inserted within the target track of the target timeline sequence.

In some embodiments, the target timeline sequence can be edited, allowing for insertion or removal of all or portions of the multiple-camera video and/or audio tracks, including the source timeline sequence, and/or video and audio tracks and clips within the source timeline sequence, any references of or pointers to the timeline sequences or tracks, or any editing combination thereof. The software can provide a display of each of the multiple-camera tracks from the source timeline sequence, and allow those tracks and/or video clips within those tracks to be added or deleted.

When edits are made to the source timeline sequence, the target timeline sequence can automatically be updated with the changes. The changes can be displayed in a multiple-camera monitor. Each monitor can refer to a separate window or screen on a user's display panel, each monitor can display one of the video tracks, and each video track can correspond to video footage from a distinct camera in the multiple-camera system. Additional monitors can be used for displaying the source and target timeline sequences. For example, monitors can be used to present audio/video in the assembly or edits of multiple audio/video clips into the audio/video tracks of the source timeline sequence, and monitors can be used to present audio/video in the generation or edits of the source and target timeline sequences.

The system or software program can include a multiple-camera monitor, in which each track can be shown in a separate monitor. Each track can include audio and video clips corresponding to footage from one of the cameras. The multiple-camera monitor can display monitors for simultaneous video tracks, and can include a monitor displaying a selected track that is designated to play from the source timeline sequence. In some embodiments, the multiple-camera monitor can display a number of separate streams of video, in which each stream of video can correspond to a track and can be shown in a separate monitor or portion of a monitor. There can be an output monitor or a preview monitor to present audio/video in the source timeline sequence or the target timeline sequence. In other embodiments, any of the multiple-camera monitors can be used to facilitate editing. The system or software program can include a controller to control monitor selection and editing of any of the tracks and timeline sequences.

A system or software user can select one of the video tracks to be the selected track as part of the source timeline sequence. As compared with traditional multiple-camera editing, the instant disclosure provides techniques by which multiple audio or video clips can be included in each track. In other words, there need not be a limit of having only one clip per track after combining clips from multiple camera source footage. A video/audio track can be selected and inserted into, removed from, or referenced from the timeline sequence without destroying or modifying the video/audio clips within the video/audio track. Since the clips and/or the tracks themselves need not be altered, deleted, or modified, those clips and/or tracks can be retrieved later in their entirety for subsequent editing into the timeline sequence. After the edits have been made to the source timeline sequence, the tracks, the clips, or any of their combinations, within the source timeline sequence, the target timeline sequence can be automatically updated to include the changes of the source timeline sequence. The changes to the contents of the source or target timeline sequences can automatically be shown in a window or monitor. When video tracks are created by assembling the video clips, the software program can automatically generate corresponding audio tracks if corresponding audio is available for the video clip. Also, when the source and target timeline sequences are created or edited, the software program can automatically generate and update source and target audio timeline sequences to correspond to the source and target video timeline sequences.

The target timeline sequence can include video and audio from multiple, embedded, source timeline sequences. All or portions of the source timeline sequences can be included in the target timeline sequence. Multiple video tracks can be synchronized at a point in the timeline or during an event. So when synchronized, there can be multiple cameras displaying the same event in the multiple-camera monitor at the same time. The synchronization can be performed automatically by the software, manually by the user of the software, by a similar time length of the tracks, by a similar recording time of the video footage of the tracks, or by an audio or video marker or cue. The audio can follow the video. Alternatively, the audio can be inserted into or deleted from any of the tracks and timeline sequences. Multiple-camera monitors can simultaneously display multiple camera angles playing in a source and/or target timeline sequence.

As shown in FIG. 1, an example multiple-camera monitor 110 can display video footage from four different cameras. The multiple-camera monitor 110 can be shown in a panel or window in a display, and can be used to create a timeline sequence. Creating the timeline sequence can involve editing, such as inserting or removing, all or portions of video tracks from the timeline sequence at different time locations in the timeline sequence. In this aspect, the timeline sequence can include various portions of video clips from one or more selected video tracks.

Camera 1 Window 120 shows footage from a first camera, Camera 2 Window 124 shows footage from a second camera, Camera 3 Window 128 shows footage from a third camera, and Camera 4 Window 130 shows footage from a fourth camera. Each of the camera windows shows footage from a distinct track of video from the source sequence. Each track of video can be created from one or more video clips. Video clips can refer to a segment of a video recording, video footage with a finite duration, or a file that contains a short video item, such as an excerpt from a longer video recording. For example, video clips may be short films, or even promotional videos, such as in commercials and advertisements. Each track of video may also include other types of still images, frames, and moving images, such as B-roll and stock footage. The multiple-camera monitor can facilitate the creation of a track of video by allowing a software program user to insert and delete video clips from a track, in which the track and corresponding changes to the track can be displayed in a window of the multiple-camera monitor 110. Also, each track of video may have a corresponding track of audio. The timeline panel 138 can display a total duration of video footage, and present time locations for the video footage for one or more of the tracks. The timeline panel can also include time markers for one or more of the tracks, as well as the overall created timeline sequence. In some embodiments, the time markers can be used to facilitate synchronizing the tracks, and can be used in creating and editing the timeline sequence. The number of windows and corresponding tracks are not limited to the number shown in FIG. 1, but may be of a greater or lesser number.

The multiple-camera monitor 110 can simulate live camera switching and can facilitate editing of video footage in real-time. In some embodiments, the multiple-camera monitor 110 can show four video tracks simultaneously. A user of the multiple-camera monitor 110 can use a multiple-camera control panel 140 to switch between video from the camera windows 120, 124, 128, 130 to show a selected camera window 134. The selected-camera window 134 shows which one of the camera windows is currently actively playing in a timeline sequence. The selected-camera window 134 can also be used for previewing edits into the timeline sequence. The locations of the windows 120, 124, 128, 130, 134 are not limited to the locations shown in FIG. 1, but may be in various locations in the multiple-camera monitor 110.

In some embodiments, the windows 120, 124, 128, 130, 134 can be moved to other locations within the multiple-camera monitor 110. In other embodiments, the windows 120, 124, 128, 130, 134 can be detached from the multiple-camera monitor 110, and the detached window can be presented in a stand-alone window (not shown). The timeline sequence can be edited with drag-and-drop functionality using any of the windows 120, 124, 128, 130. In some embodiments, the multiple-camera control panel 140 can include controls for editing the tracks, as well as the video and audio clips within those tracks. A software controller can control editing of the video footage in any of the video tracks and timeline sequences. The multiple-camera control panel 140 can include selectors for cutting and pasting video and audio clips and/or tracks in the timeline sequence. Other selectors may include, but are not limited to, controls for volume, playing, pausing, stopping, fast-forwarding, rewinding, recording, shuffling, searching, repeating, multi-channel equalizing, playlists, deleting, sorting, randomizing, cropping, selecting, saving, importing, exporting, hiding and unhiding windows, and adjusting brightness, contrast, color, and window size and position.

The tracks can be synchronized to facilitate editing and creating the timeline sequence. In some embodiments, the tracks can be synchronized according to when a clip begins or ends in one or more tracks. In other embodiments, the tracks can be synchronized according to a time of the tracks or clips (e.g., common footage recorded at a time of day in hours, minutes, and seconds), a time marker in the tracks or clips (e.g., a footage duration marker in hours, minutes, and/or seconds), or a cue in the tracks or clips, (e.g., a flash or clapper, or audio/visual cues from the footage). The tracks can be manually synchronized by a software user, or can be synchronized automatically with the software program.

Figure 2:
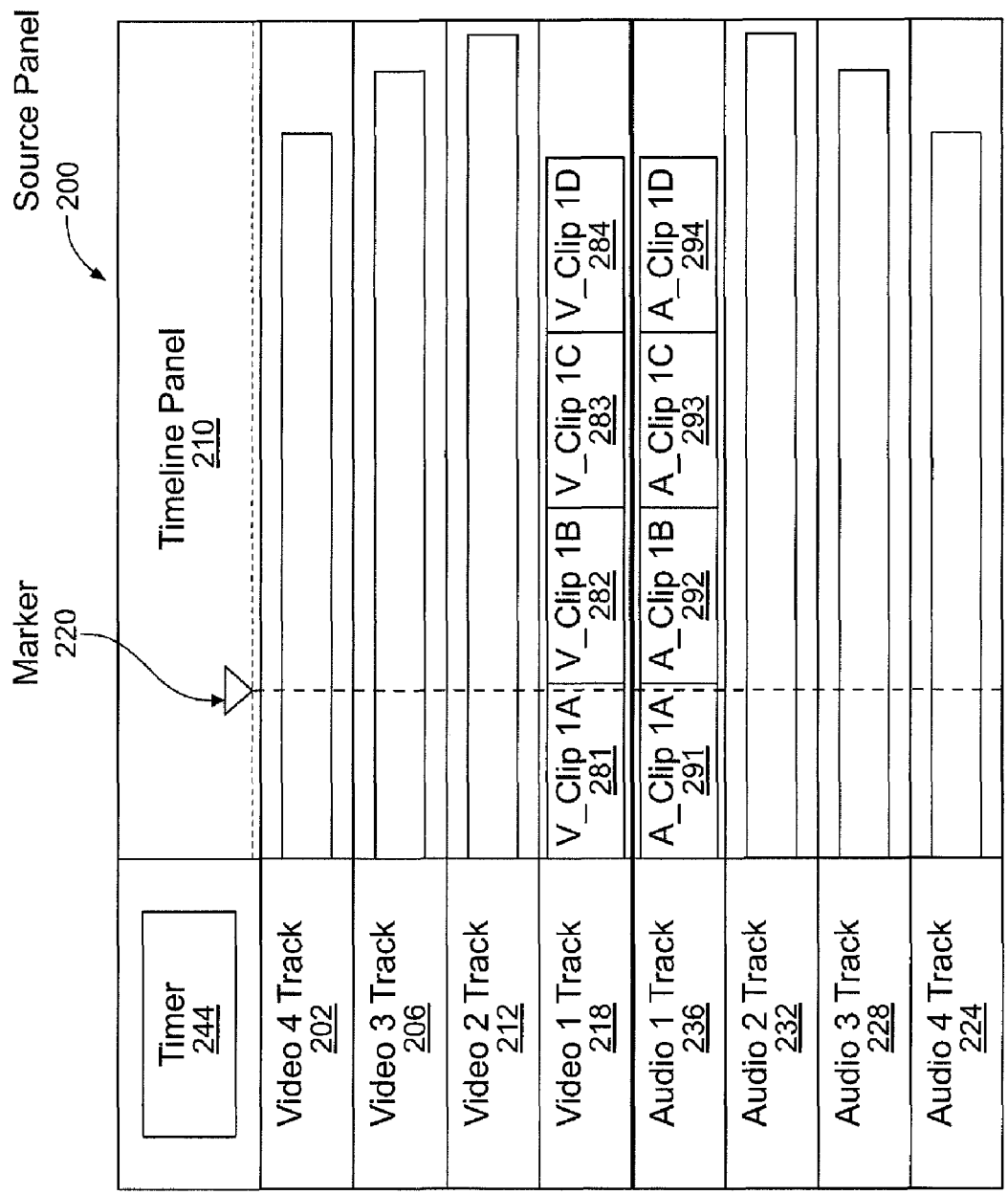
FIG. 2 shows an example source panel for a source timeline sequence.

FIG. 2 shows an example source panel 200 for a source timeline sequence. The source panel 200 may be displayed along with the multiple-camera monitor 110, and can be used in creating the source timeline sequence. The source panel 200 shown in FIG. 2 has four video tracks, Video 1 Track 218, Video 2 Track 212, Video 3 Track 206, and Video 4 Track 202, and four audio tracks, Audio 1 Track 236, Audio 2 Track 232, Audio 3 Track 228, and Audio 4 Track 224. The source panel 200 is not limited to the number of audio and video tracks shown, but may include any number of tracks. The video tracks 202, 206, 212, 218 may or may not have corresponding audio tracks 224, 228, 232, 236. The video tracks 202, 206, 212, 218 can be rearranged in the source panel 200, and/or moved into or out of the source panel 200 via a selector control or with a drag-and-drop feature.

In the embodiment of FIG. 2, the timeline panel 210 shows a time duration of the tracks. The timeline panel 210 may have features to allow zooming into and out of a time duration. The timeline panel 210 may also have one or more markers, such as marker 220, to facilitate editing and synchronizing. A timer 244 may show one or more time-related features, such as a time duration of the tracks or source sequence, a time of day, or an amount of time the source sequence has been edited.

The multiple-camera control panel 140 of FIG. 1 can be used to control the video tracks and can be used to toggle the multiple-camera monitor between a record mode, to enable multiple-camera editing, and out of the record mode to disable multiple-camera editing. In one embodiment, the record mode records edits made during playback of the timeline sequence. When not in a record mode, there can be playback of the timeline sequence, including any existing edits in the timeline sequence. In another embodiment, the record mode also records while the timeline sequence is being created from the footage in the tracks.

In traditional digital or software-based multiple-camera editing, multiple source video clips are selected in a bin, before the clips have been assembled into a timeline sequence, and the clips are then packaged into a single, multiple-camera clip. The single, multiple-camera clip can then be added to an existing video sequence. In traditional multiple-camera editing, only one audio or video clip may be contained on each track. So, each audio or video clip that is selected is placed on a separate track. Also, after the single, multiple-camera clip has been created, the source audio and/or video that created the single, multiple-camera clip cannot be edited. If the multiple-camera clip needs to be modified, then the multiple-camera clip is recreated from the source footage in the traditional approach.

In an advantage over traditional multiple-camera editing, the instant disclosure provides techniques in which multiple audio or video clips may be included in each source or target track (e.g., FIG. 2 shows audio clips 291, 292, 293, 294 in Audio 1 Track 236, and video clips 281, 282, 283, 284 in Video 1 Track 218). In other words, there is no limit of only one clip per track. In another advantage over traditional multiple-camera editing, a video/audio track can be selected and inserted into, removed from, or referenced from the timeline sequence without destroying or modifying the video/audio clips within the video/audio track. Since the clips and/or the tracks themselves are unaltered and not deleted or modified, those clips and/or tracks can be retrieved later in their entirety for subsequent editing into the timeline sequence. The instant disclosure reveals techniques to allow for more than one video clip to be assembled on each track, and each track can be fully-editable at any time.

Figure 3:
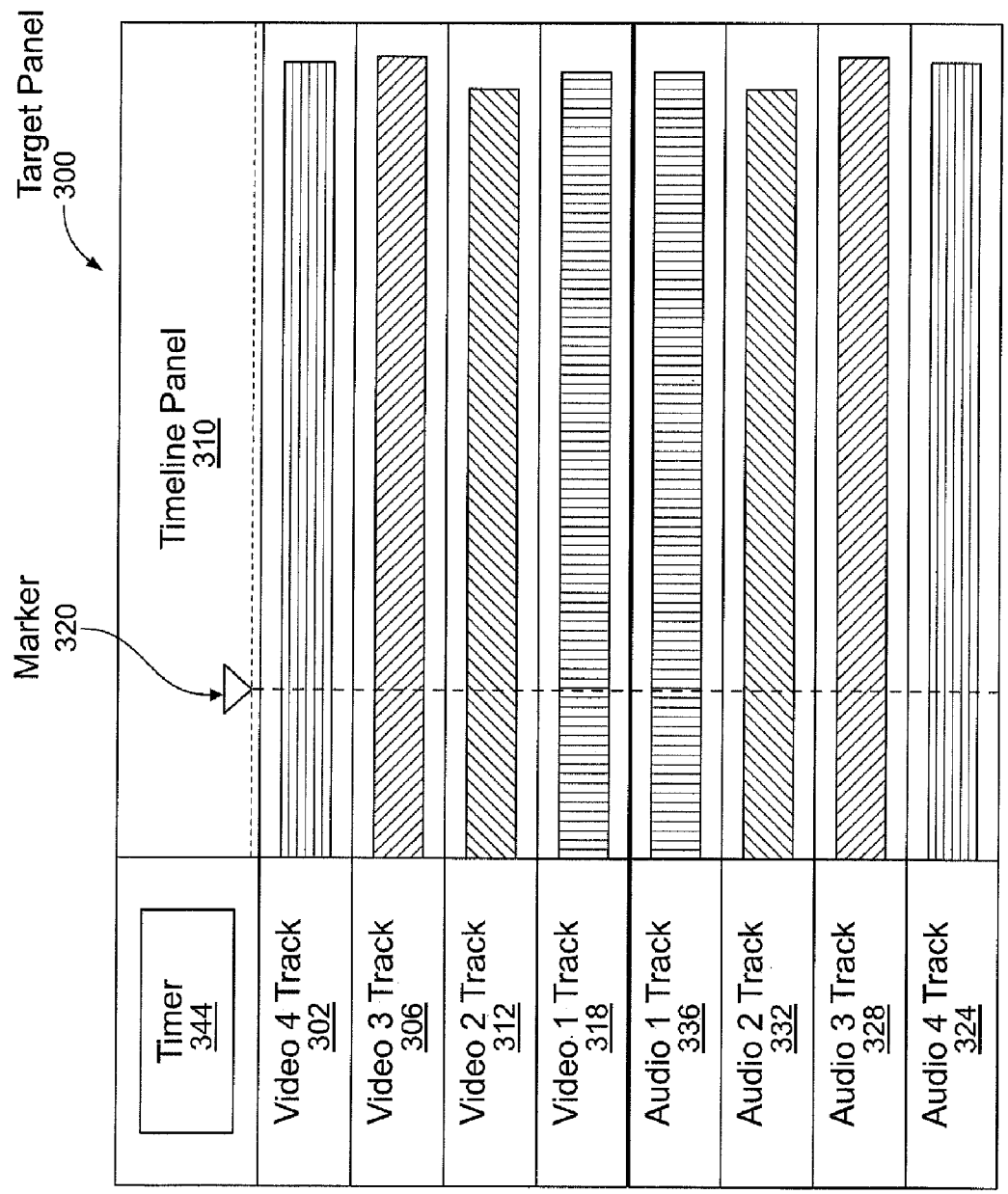
FIG. 3 shows an example target panel for a target timeline sequence.

FIG. 3 shows a target panel 300 for a target timeline sequence. The target panel 300 can be displayed along with the multiple-camera monitor 110 and/or the source panel 200, and can be used in creating the target timeline sequence. The target panel 300 shown in FIG. 3 has four video tracks, Video 1 Track 318, Video 2 Track 312, Video 3 Track 306, and Video 4 Track 302, and four audio tracks, Audio 1 Track 336, Audio 2 Track 332, Audio 3 Track 328, and Audio 4 Track 324. The target panel 300 is not limited to the number of audio and video tracks shown, but may include any number of tracks. The video tracks 302, 306, 312, 318 may or may not have corresponding audio tracks 324, 328, 332, 336. The video tracks 302, 306, 312, 318 can be rearranged in the target panel 300, and/or moved into or out of the target panel 300 via a selector control and/or with a drag-and-drop feature. Each of the tracks 302, 306, 312, 318, 324, 328, 332, 336 shown in FIG. 3 can include a source timeline sequence, such as the source timeline sequence generated from FIG. 2.

The timeline panel 310 can include a time duration of the tracks. The timeline panel 310 can include features to allow zooming into and out of a time duration (e.g., from minutes to seconds to fractions of a second). The timeline panel 310 can also have one or more markers, such as marker 320, to facilitate editing and synchronizing. A timer 344 can show one or more timer features, such as the time duration of the tracks, source sequence, time of day, or an amount of time the source timeline sequence has been edited.

The multiple-camera control panel 140 of FIG. 1 can be used to control the video tracks and can be used to toggle the multiple-camera monitor into a record mode to enable multiple-camera editing. In some embodiments, the record mode records edits made during playback of the target timeline sequence. In other embodiments, the record mode also records while the timeline sequence is being created from the footage in the tracks. Unlike the tracks shown in the source panel 200 of FIG. 2, any number of the tracks shown in the target panel 300 of FIG. 3 can include a source timeline sequence.

Figure 4:
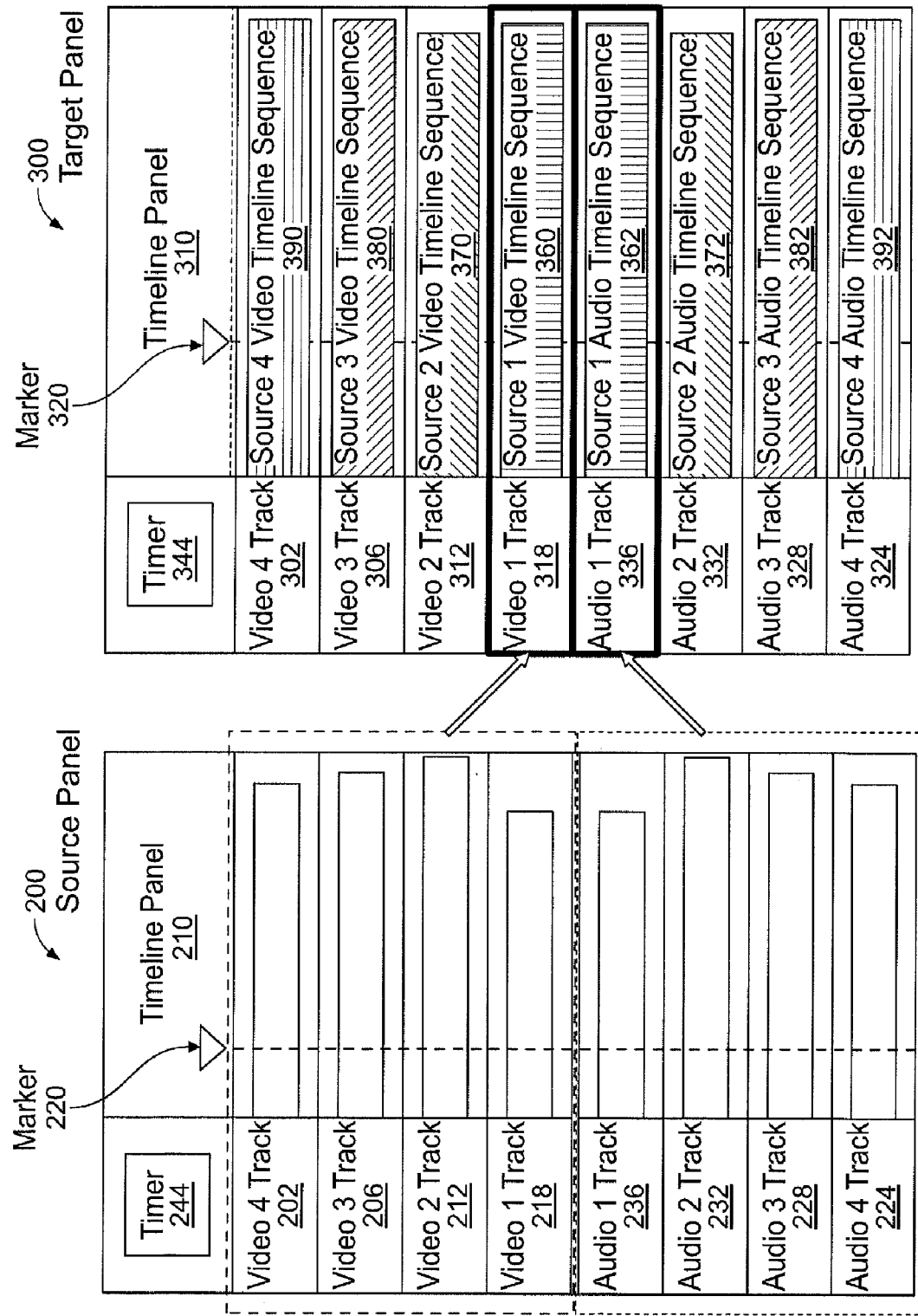
FIG. 4 shows an example of embedding the source timeline sequence into the target timeline sequence.

FIG. 4 shows embedding the source timeline sequence into the target timeline sequence. In some embodiments, the embedding/nesting can refer to inserting and including at least some audio/video portions of the source timeline sequence into a target track of the target timeline sequence. In other embodiments, the embedding/nesting can refer to pointing, mapping, linking, or referring to at least some audio/video portions of the source timeline sequence from a target track of the target timeline sequence. A user of a software program can assemble source footage into various clips (e.g., video clips 281, 282, 283, 284), which are inserted into the tracks of video and audio in the source panel 200. A first timeline sequence or source timeline sequence can be created from all or portions of any of the multiple source tracks. The source timeline sequences 360, 362 can be inserted into or referred to at least one track (e.g., 318, 336) of the target panel 300. For example, a user may select and drag a window or monitor showing the source timeline sequence or another visual representation of the source timeline sequence in the source panel 200 into a track representation of the target panel 300, such as a monitor/window showing the track. The second or target timeline sequence is created from the editing of the tracks (e.g., 302, 306, 312, 318, 336, 332, 328, 324) in the target panel 300. The target timeline sequence may include all or portions of any of the tracks in the target timeline sequence, including any combinations of all or portions of any of the target tracks or references.

The target timeline sequence can be edited, allowing for insertion or removal of the multiple-camera video and/or audio, including the source timeline sequence 360, 362, the tracks 302, 306, 312, 318, 336, 332, 328, 324 and/or video clips within any of the source timeline sequences, or any editing combination thereof. The software can provide a display of the multiple-camera tracks from source timeline sequence, and allow those tracks and/or video clips within those tracks to be added, deleted, or modified. After the source timeline sequence 360, 362 has been edited, the target timeline sequence can automatically include the updated changes since the content of the target timeline sequence can include edits from portions or all of the source timeline sequence. The changes can be displayed in a multiple-camera monitor 110, as shown in FIG. 1. Each monitor can refer to a separate window or screen on a user's display panel, and each monitor can display one of the video tracks. In some embodiments, the multiple-camera monitor 110 can include a monitor for any of the tracks 202, 206, 212, 218, 236, 232, 228, 224, 302, 306, 312, 318, 336, 332, 328, 324 in the target panel 300 and the source panel 200. The multiple-camera monitor 110 can display video from any or all of the tracks simultaneously. Users of the software program can conduct multiple-camera edits by switching between the various monitors.

In another embodiment, the tracks 302, 306, 312, 318, 336, 332, 328, 324 in the target panel 300 include a mixture of source video timeline sequences and video clips not within a source video timeline sequence. For example, Video 1 Track 318 and Video 2 Track 312 may be source video timeline sequences, and Video 3 Track 306 and Video 4 Track 302 may include one or more video clips, but not a source video timeline sequence.

Figure 5:
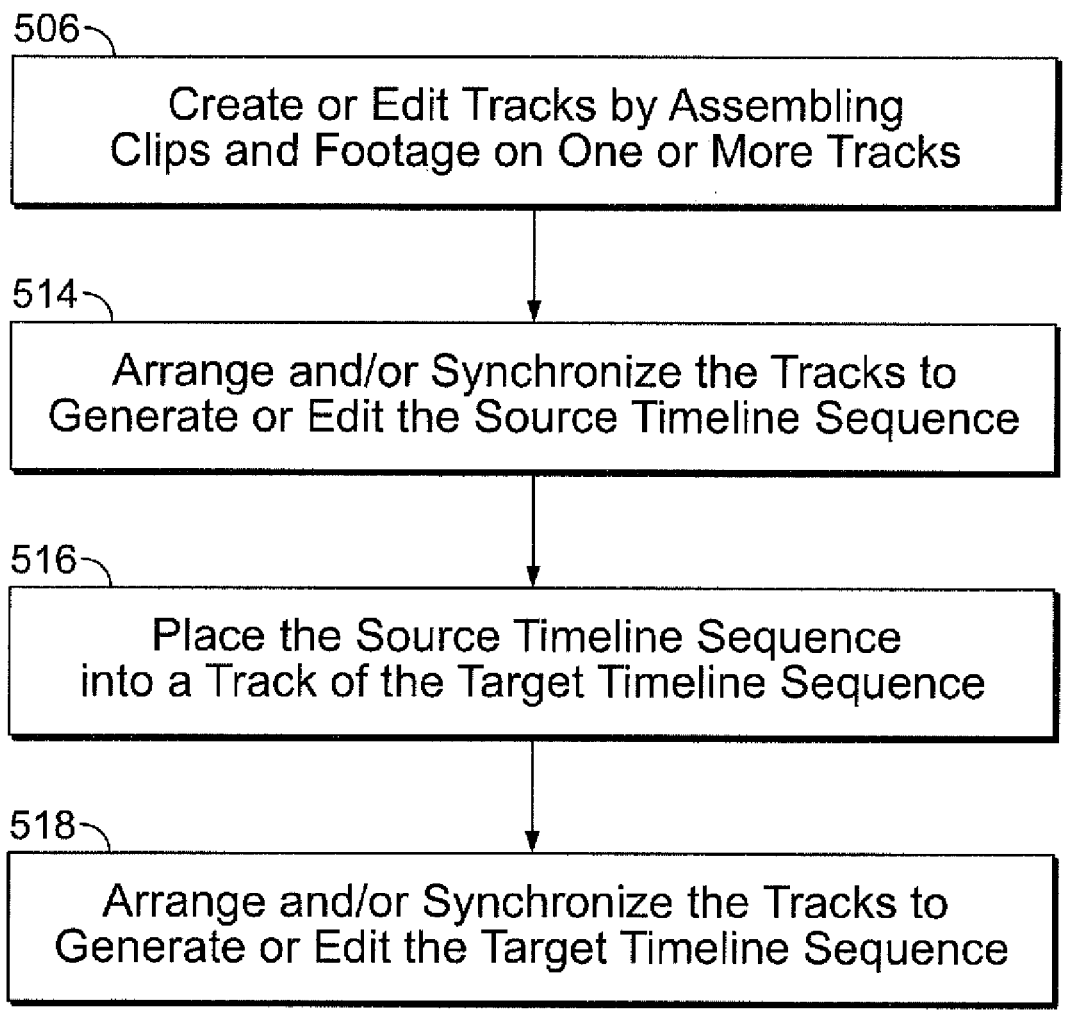
FIG. 5 shows a flowchart for generating a target timeline sequence.

FIG. 5 shows an example flowchart for generating a target timeline sequence. One or more tracks can be created at 506 from assembling one or more video clips on each track. Each track may also have other types of still images, frames, and moving images, such as B-roll and stock footage. Alternatively, if the tracks already exist, the tracks can be edited at 506, for example, by adding or removing footage and clips from any of the tracks. A source timeline sequence can be generated at 514 from the arrangement and synchronization of the tracks. Alternatively, if the source timeline sequence already exists, the source timeline sequence can be edited at 514. In generating or editing the source timeline sequence, all or portions of any of the tracks can be added to or removed from the source timeline sequence in any combination.

The source timeline sequence is then embedded/nested into a track of the target timeline sequence at 516. If the target timeline sequence has more than one track, then the target timeline sequence that is generated can have video clips and footage from any of the tracks associated with the target timeline sequence. For example, the target timeline sequence can include portions or all of the source timeline sequence generated or edited at 514, as well as other source timeline sequences and tracks with one or more video clips. Each track may also have other types of still images, frames, and moving images, such as B-roll and stock footage. If the target timeline sequence has tracks other than the source timeline sequence, then those other tracks can be edited within the target timeline sequence as well.

A target timeline sequence can be generated at 518 from the arrangement and synchronization of the tracks associated with the target. Alternatively, if the target timeline sequence already exists, the target timeline sequence can be edited at 518. In generating or editing the target timeline sequence, all or portions of any of the tracks can be added to or removed from the target timeline sequence.

In some embodiments, the source timeline sequence and any tracks and video clips within the source timeline sequence can be edited, even when the source timeline sequence is embedded within the target timeline sequence. Any edits to the source timeline sequence can be automatically updated in the target timeline sequence. For example, since the source timeline sequence is nested or embedded within the target timeline sequence, any edits and changes to the source timeline sequence may be automatically updated in the track of the target timeline sequence that contains the source timeline sequence. So, if all or portions of the target timeline sequence are included within the generated target timeline sequence, then the target timeline sequence will automatically include any updates from edits to the source timeline sequence. In other embodiments, since the target timeline sequence can include tracks from multiple source timeline sequences (e.g., source timeline sequences in addition to the source timeline sequence placed at 516), as well as tracks with video clips and footage not generated from a source timeline sequence, any edits made to any of the tracks of the target timeline sequence can be automatically reflected in an updated target timeline sequence.

The software program can enable a user to view any or all of the tracks simultaneously, with each track presented in a separate monitor. To facilitate editing and timeline sequence creation, the source timeline sequence and the target timeline sequence may also be presented in separate monitors.

Figure 6A:
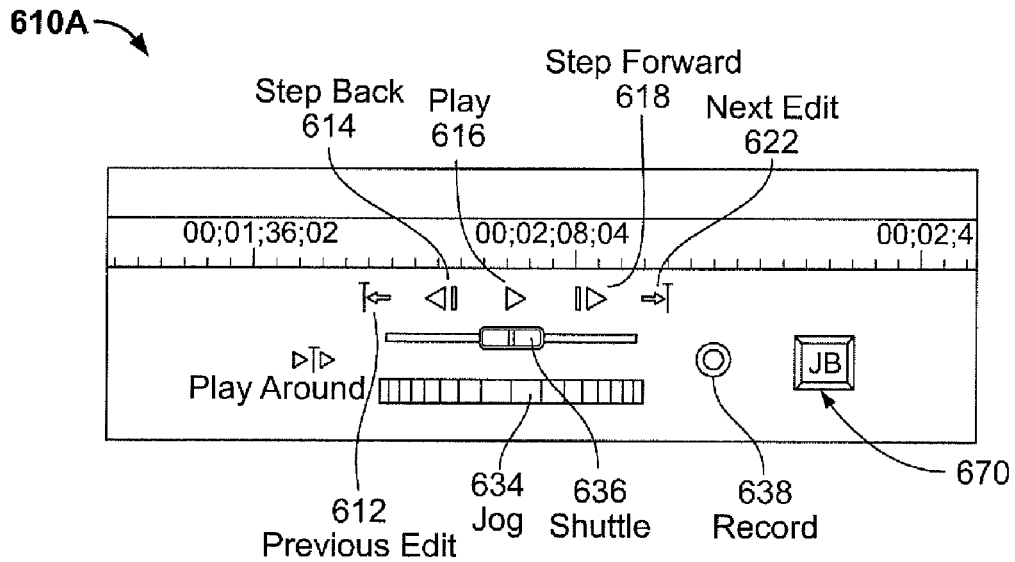
FIGS. 6A-6B show examples of control panels.
Figure 6B:
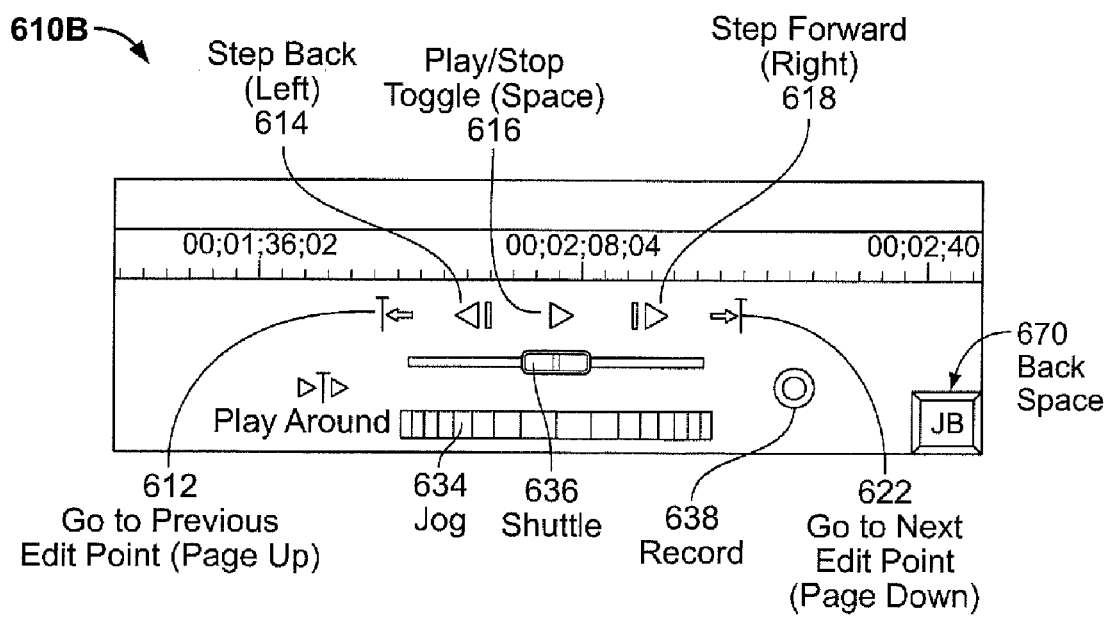

FIGS. 6A-6B show examples of control panels 610A, 610B. FIG. 6A shows an example of a control panel 610A that can be used with multiple-camera monitors. The Play control 616 is used for initiating playback of video, with or without corresponding audio. The playback of video can include footage from any track of any timeline sequence. The Previous Edit control 612 can be used to move the playing position in the timeline sequence to a previous edit point in the timeline sequence. The Next Edit control 622 can be used to move the playing position in the timeline sequence to a next edit point in the timeline sequence. The edit points can serve as the breaks or cuts between clips in a track. The Step Back control 614 can be used to move the playing position back a predetermined amount of time or a predetermined amount of frames in the timeline sequence. The Step Forward control 618 can be used to move the playing position forward a predetermined amount of time or a predetermined amount of frames in the timeline sequence. The Jog control 634 moves the playing position forward in a timeline sequence one frame at a time. The Shuttle control 636 can be used to move the playing position in the timeline sequence to another location in the timeline sequence at a speed greater than can be performed with the step back or step forward controls. The jump back "JB" selector 670 is described below with respect to FIG. 10.

The record control can toggle the multiple camera system into record mode to enable editing to the timeline sequence. In one embodiment, selecting a different camera to be actively playing in the multiple camera monitor can switch the video output to the footage playing in the selected camera. For example, if Camera 1 Window 102 in FIG. 1 is playing in the timeline sequence and being displayed in Selected Camera Window 134, then selecting Camera 2 Window 124 can create a new edit point and the footage in Camera 2 Window 134 is displayed in Selected Camera Window 134 while the selected camera footage is overwritten onto the timeline sequence. In some embodiments, the overwriting of the selected camera footage in the timeline sequence will only occur when the Record control 638 is enabled. In other embodiments, selecting a different camera source from the camera source that is currently playing can automatically trigger the overwriting.

In some embodiments, a user can begin editing by enabling the Record control 638, initiating playback with the Play control 616, and switching to a camera source to select the footage to overwrite video in the timeline sequence. Alternatively, a user can begin editing by initiating playback with the Play control 616, enabling the Record control 638, and switching to a different camera source to select footage to overwrite the video in the timeline sequence, in which the switching to a different camera source can trigger the overwriting.

In some embodiments, edits points can be created at the switching of sources of footage between different cameras in the timeline sequence. In other embodiments, edit points can be created when tracks are added or removed from the timeline sequence. Pre-recorded edit points in a timeline sequence can be overwritten when footage recorded from playing video records over the pre-recorded edit points.

FIG. 6B shows a control panel 610B that uses shortcuts on a keyboard. The control panel 610B can be used for initiating the various video and audio controls in response to a user using "keyboard shortcuts" or single or double character strokes on a keyboard. For example, the Play control 616 can be initiated in response to a spacebar stroke on a keyboard. The Step Back control 614 can be initiated in response to the left arrow on a keyboard, and the Step Forward Control 618 can be initiated in response to the right arrow. The Previous Edit control 612 can be initiated in response to a page up selection on a keyboard, and the Next Edit 622 can be initiated in response to a page down selection. The controls in the control panel 610B may be activated by other keyboard shortcuts, such as numbers 1, 2, 3, 4, to represent shortcuts for directional playback controls 614, 616, 612, 622. The control panels 610A, 610B are not limited to be used in systems for multiple-camera monitors, but can also be used with single-camera systems.

Figure 7:
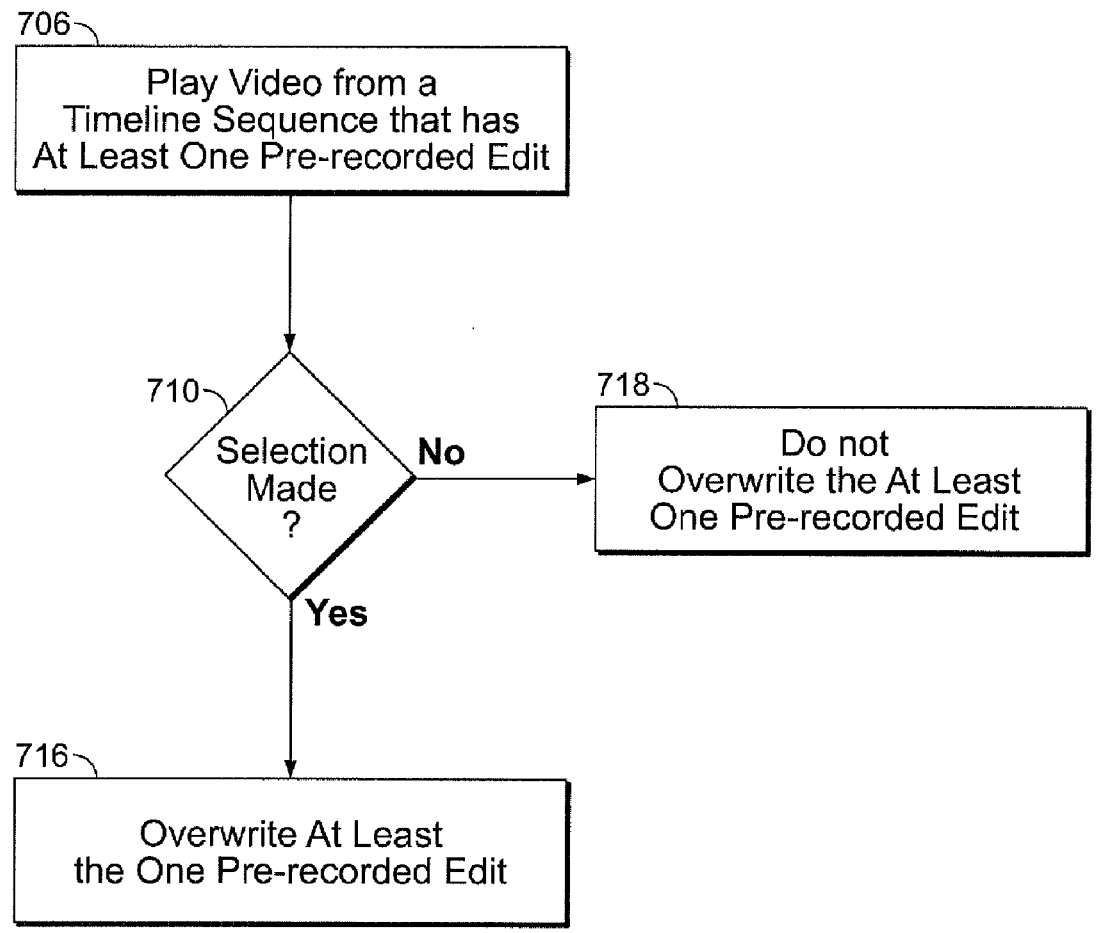
FIG. 7 shows a flowchart for overwriting pre-recorded edits.

FIG. 7 shows a flowchart for overwriting pre-recorded edits. The flowchart shows that video is played at 706 from a timeline sequence that has at least one pre-recorded edit. If a selection is made at 710 that is associated with the multiple-camera source then the pre-recorded edit is overwritten at 716. If no selection is made at 710 that is associated with the multiple-camera source then the pre-recorded edit is not overwritten at 718, and the original pre-recorded edit can play in the timeline sequence. In some embodiments, the selection associated with the pre-recorded edit can involve switching to a different camera source while the video is playing. The switching to different camera source from the camera source that is being played can trigger overwriting of the pre-recorded edit. The overwriting of the pre-recorded edit can occur while playing the video at a play rate that is faster than realtime, a play rate that is slower than realtime, a user-selected play rate, during video scrubbing, or during realtime playback.

In other embodiments, the Record control 638 should be enabled in order to enable overwriting, whether or not a different camera source is selected. If the Record control 638 is enabled, then the overwriting of the pre-recorded edit can commence if a different camera source is selected. If the Record control 638 is not enabled, then the overwriting may not occur, even though a different camera source is selected. In some embodiments, the overwriting of the pre-recorded edit may stop when a Stop selector 616 is selected, the playing of the video terminates, or when the Record control 638 is disabled or toggled in an off position. In other embodiments, the overwriting of the pre-recorded edit can end when a camera source is selected that is different from the camera source that triggered the overwriting. In some embodiments, the overwriting of the pre-recorded edit may terminate because an end of a track or an end of the timeline sequence has been reached.

In some embodiments, any type or number of timeline sequences can have any number of pre-recorded edits overwritten during playback, including pre-recorded edits in source and target timeline sequences. Any track within a timeline sequence can have any number of pre-recorded edits in that track overwritten. The overwriting of a pre-recorded edit can extend or shorten the length of the time of any clip in any track. In other embodiments, the overwriting can only occur when a nested, multiple-camera timeline sequence is being played.

The flowchart of FIG. 7 is not limited to multiple-camera sequences. In some embodiments, the overwriting of the pre-recorded edit can occur by selecting a selector, such as the Record control 638, to trigger overwriting of the pre-recorded edit. Disabling the Record control 638 can stop the overwriting. In some embodiments, there may not be multiple-camera sources that are available to be used to switch to a different camera to trigger overwriting. In these embodiments, the source of the video can be from stock footage, single-camera footage, or from a source different than from a multiple-camera source. In some embodiments, the source of the video for tracks or timeline sequences may be unknown, including unknown sources of video for multiple-camera timeline sequences.

Figure 8:
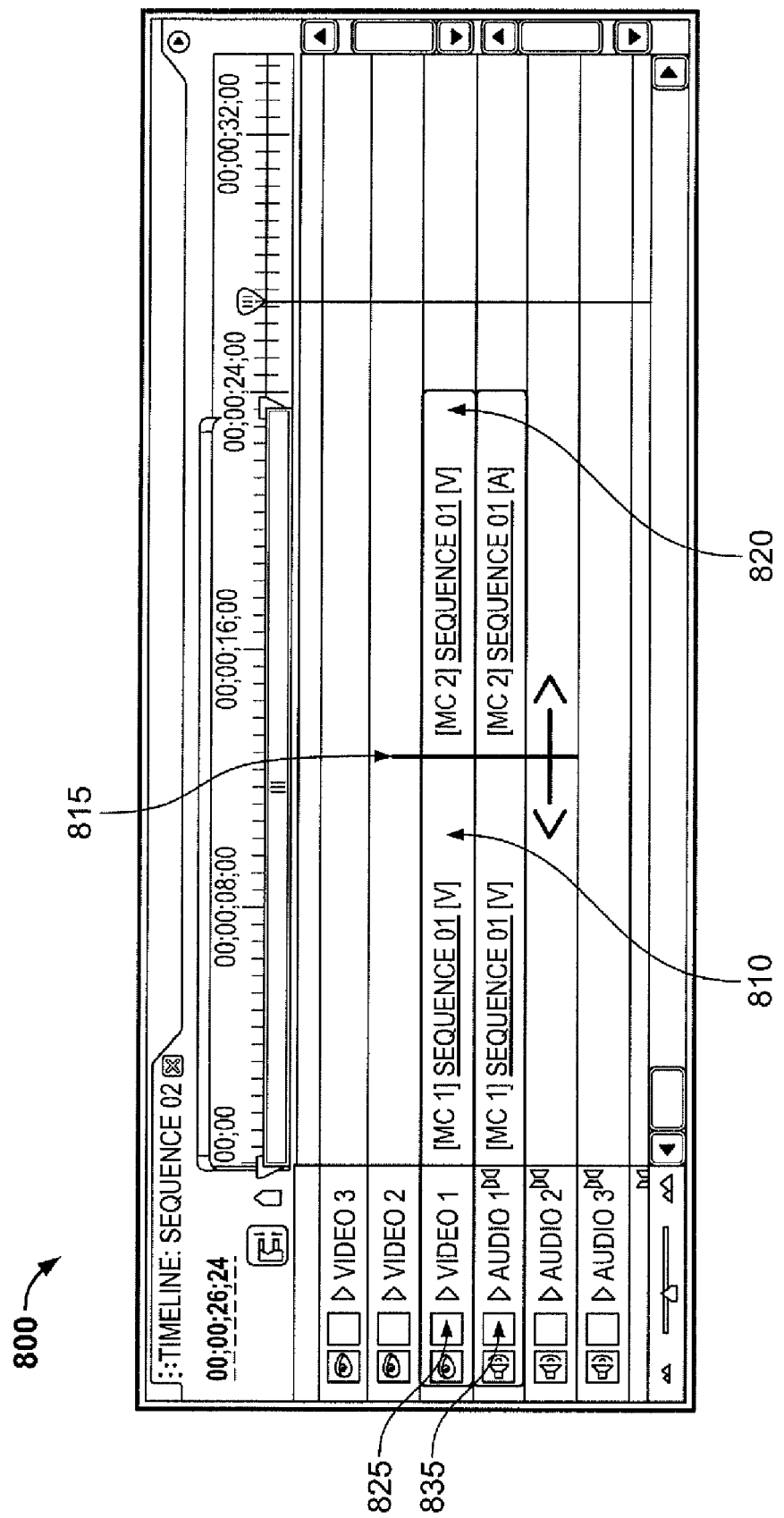
FIG. 8 shows an example of a timeline sequence.

FIG. 8 shows an example of a timeline sequence 800 with a video track 825 and an audio track 835. The video track 825 includes two clips 810, 820, with each clip having footage from a different camera in the multiple-camera source.

In some embodiments, the multiple camera monitor can include a "preview" monitor to display what an edited timeline sequence will look like as the edits are made. When the playback is stopped, edit points are created at each location where switching occurred between different cameras in the timeline sequence. Each resulting clip 810, 820 in the track 825 can be labeled with an identity of the camera used for the footage in that clip.

For example, video track 810 in timeline sequence 800 is labeled "MC 1" for Multiple Camera 1, and video track 820 is labeled "MC 2" for Multiple Camera 2. Edit point 815 is between the two clips 810, 820 of video footage in track 825 of timeline sequence 800. When the Record control 638 is disabled, the track 835 can play back through each clip. Since the video track 825 in the timeline sequence 800 is the only video track shown then the timeline sequence playback can display the footage in the clip 810 for MC 1 followed by the footage in the clip 820 for MC 2. In some embodiments, edit points can be created in the timeline sequence in realtime when a different camera source is selected from the camera source currently playing.

The number of tracks in the timeline sequence is not limited to the number shown in FIG. 8. The timeline sequence may have multiple tracks in the manner described and shown above with respect to FIGS. 2-4. In some embodiments, the timeline sequence 800 may be a target timeline sequence, and track 825 may include a source timeline sequence. In other embodiments, the track 825 may have multiple clips that can be inserted, removed, or overwritten, in which each clip may include a title and video effects.

The overwriting of the edits point 815 can extend or shorten the length of the time of the video clips 810, 820 in the track 825. For example, if the Record control 638 is enabled while the track 825 is playing in video clip 810 and a selection is made to switch to the camera source for video clip 820 before the playback reaches the edit point 815, then an edit point can be created at the switching location and the overwriting commences at that switching location. In this example, the length of the time of video clip 820 can be extended while the length of the time of video clip 810 is shortened. In another example, if the Record control 638 is enabled while the track 825 is playing in video clip 810 and a selection is made to switch to the camera source for video clip 820 sometime after the playback reached edit point 815, then the edit point 815 is overwritten and the length of the time of video clip 810 is extended until the overwriting is stopped. In this example, the length of the time of video clip 810 is extended beyond the overwritten edit point 815, and the length of the time of video clip 820 is shortened.

Figure 9:
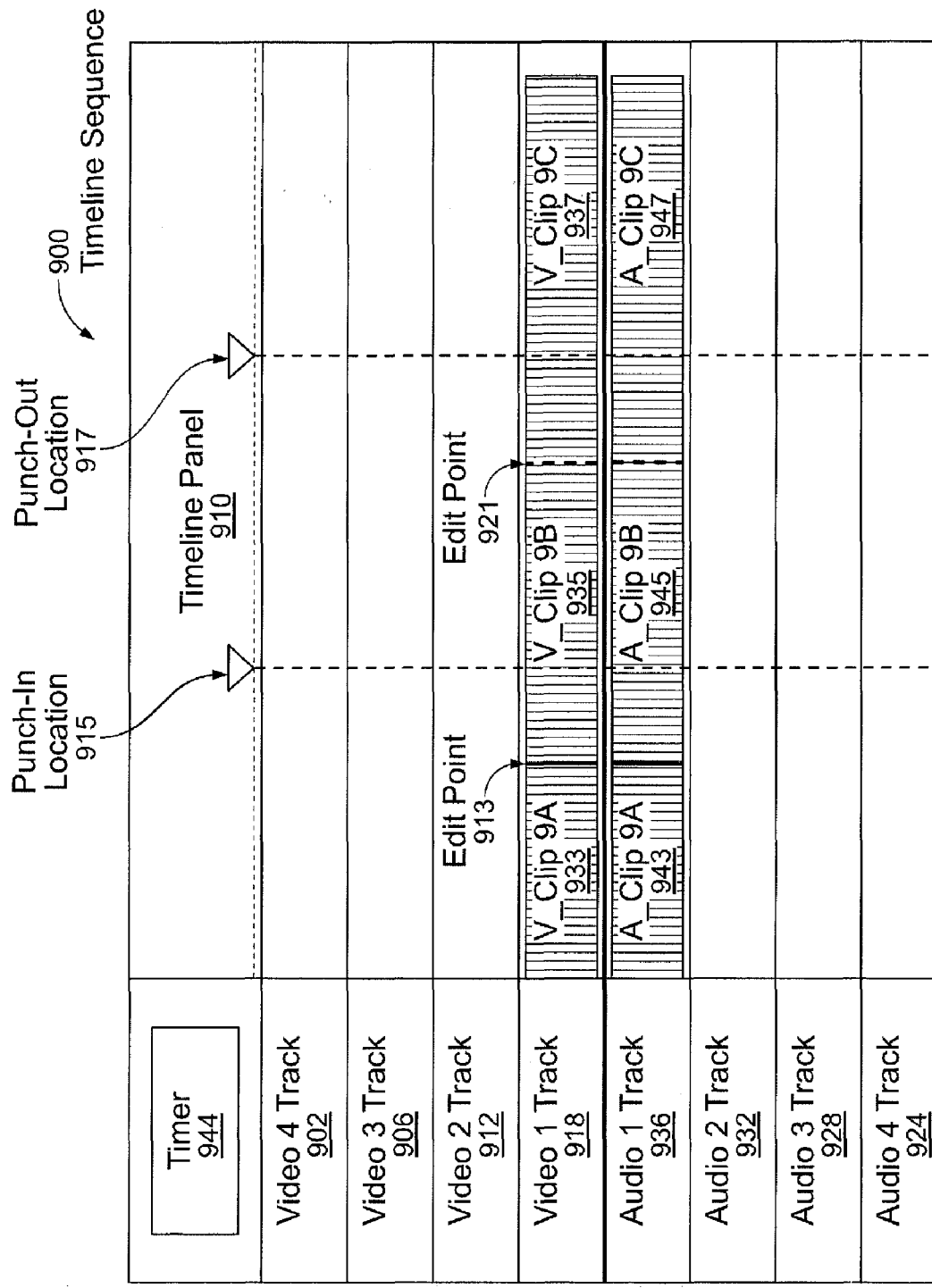
FIG. 9 shows an example of punch-in and punch-out locations in a timeline sequence.

FIG. 9 shows an example of punch-in and punch-out locations in a timeline sequence. In particular, FIG. 9 shows a timeline sequence 900 with a video track 918 and a corresponding audio track 936, in which the video track 918 includes multiple video clips 933, 935, 937. Edits points 913 and 921 separate video clips 933 and 935, and video clips 935 and 937, respectively. When the video track 918 is being played and reaches the punch-in location 915 in the video track 918, then the overwriting condition is automatically triggered. At this point, the footage of the clip that is currently playing, such as clip 935, is recorded onto track 918 and overwrites any other edit points on the track, such as edit point 921. The overwriting can end when the track reaches the punch-out location 917, at which location an edit point is created at punch-out location 917 and the remainder of track 918 includes footage from video clip 937. In some embodiments, each video clip 933, 935, 937 may represent footage from a different camera source in a multiple-camera system. In other embodiments, one or more of the video clips 933, 935, 937 may have footage that is not from a multiple-camera system. A timer 944 can show one or more timer features, such as the time duration of the tracks, source sequence, time of day, or an amount of time the source timeline sequence has been edited.

In other embodiments of the punch-in and punch-out technique, the punch-in location 915 is similar to the enable Record control 638 as in FIG. 6, and the punch-out location 917 is similar to the disable Record control 638. In this embodiment, the punch-in location will enable overwriting to occur if a selection is made as described above with respect to the flowchart of FIG. 7. For example, if the track 918 is being played and reaches the punch-in location 915, then overwriting can be enabled and overwriting can commence when a selection is made, such as switching to a different camera in a multiple-camera source. So if track 918 has only two clips 933, 935 in track 918, for example, and a selection is made after punch-in location 915 is reached to switch to a different camera source, then edit point 921 can be created for the video clip 937 for the different camera source at that switch point after the punch-in location 915. The video clip 937 can then overwrite any existing edit points in track 918 with video footage from the video clip 937 until the punch-out location is reached or until the overwriting is terminated as described above with respect to FIG. 7. So in these embodiments the punch-in and punch-out locations 915, 917 represent locations where the overwriting is enabled and disabled respectively, whereas in other embodiments overwriting commences when the punch-in location 915 is reached and the overwriting ends when the punch-out location 917 is reached. In other embodiments, overwriting can commence when the Record selector 638 is enabled, the punch-in location 915 is reached during playback, and a selection to a different camera source is made at or sometime after the punch-in location 915.

FIG. 9 is not limited to the number of audio and video tracks shown. Although a single video track 918 and a single audio track 936 are shown in the timeline sequence 900, the timeline sequence 900 could have any number of video and audio tracks, such as video tracks 902, 906, 912, 918 and corresponding audio tracks 924, 928, 932, 936, and may include a nested timeline sequence in a track. Each audio track can have edit points and multiple audio clips, such as audio track 936 having audio clips 943, 945, 947 and edit points 913, 921 as shown in time panel 910.

Figure 10:
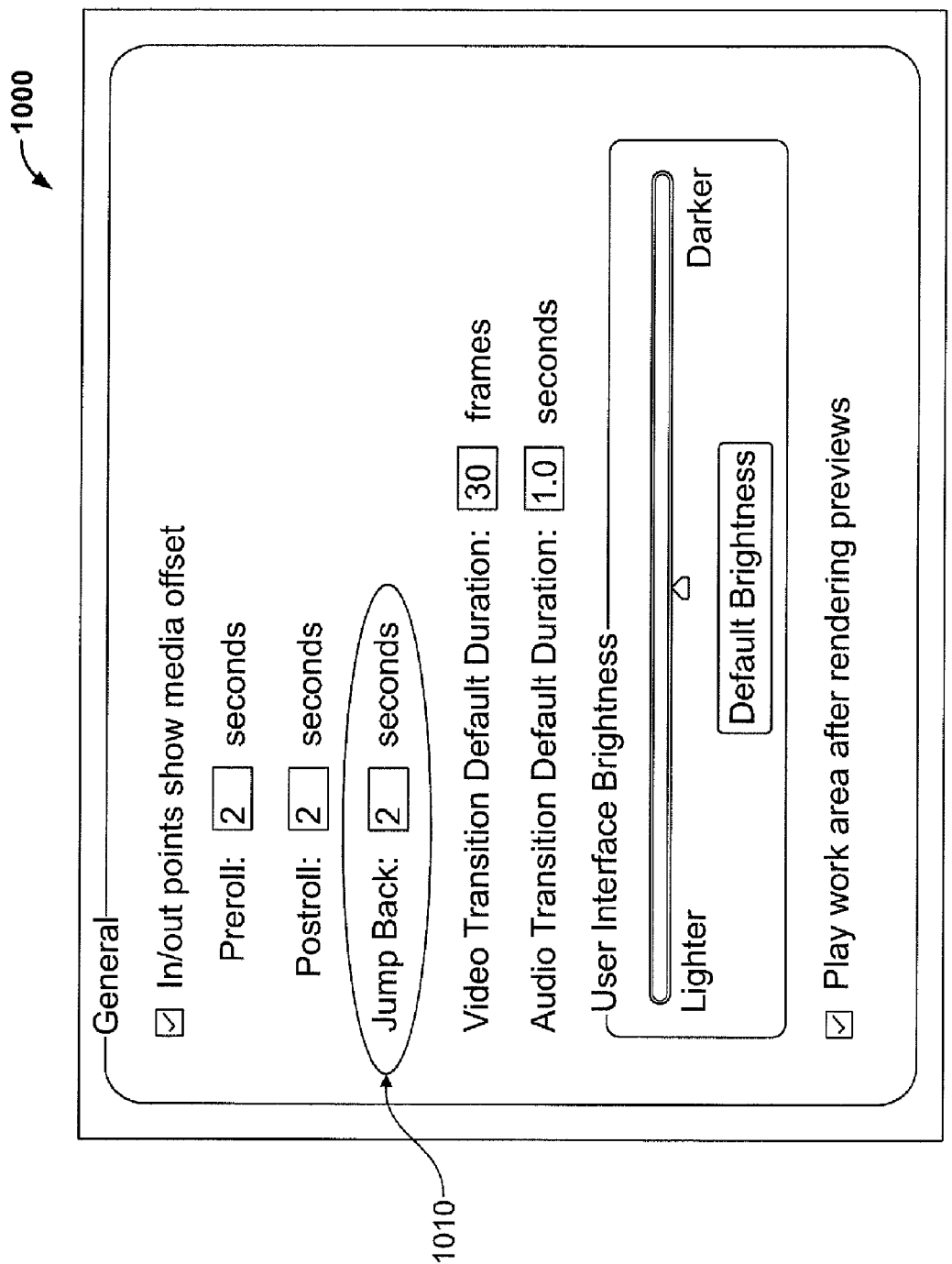
FIG. 10 shows an example of a jump back input in a graphical user interface.

FIG. 10 shows an example of a jump back input 1010 in a graphical user interface 1000. The jump back input 1010 allows a user to set an amount of time to rewind the playing video. In some embodiments, the jump back input 1010 allows a user to set an amount of frames to rewind the playing video. When the video is rewound an amount of time or frames, the video can continue to play forward from that point in the timeline sequence. The user can re-record over the rewound section of the timeline sequence by selecting a camera source that is different from the camera source currently playing. In some embodiments, playback of the video can automatically resume immediately from the jump back location. So when the playing video is re-positioned at the jump back location, the video can automatically play from that point in the timeline sequence. In some embodiments, a jump back selector 670 (FIG. 6A) can be used to trigger a jump back to a previous point in the timeline sequence. The jump back selector 670 also can be activated in response to a keystroke, such as triggering the jump back in a response to a "backspace" key as in FIG. 6B. The jump back selector is not limited to the embodiment shown in FIGS. 6A-6B, and can include keyboard shortcuts other than the "backspace" key.

In other embodiments, the jump back input 1010 can set an amount of frames or time for the step back control 614 in the control panel 610A (FIG. 6A). By jumping back an amount of time or a number of frames using the step back control 614, a selection can then be made to overwrite one or more pre-recorded edits in the rewound time or frame. In some embodiments, the jump back input 1010 can rewind the playing video a number of frames or an amount of time before a previous edit location in a timeline sequence. In other embodiments, a jump forward input (not shown) can allow a user to set an amount of frames or time for the step forward control 618 in the control panel 610A (FIG. 6A).

Embodiments of the disclosure and all of the functional operations described in this specification can be implemented in digital electronic circuitry, or in computer software, firmware, or hardware, including the structures disclosed in this specification and their structural equivalents, or in combinations of one or more of them. Embodiments of the disclosure can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the disclosure have been described. Other embodiments are within the scope of the following claims. For example, the actions recited in the claims can be performed in a different order and still achieve desirable results. For example, the number of tracks used in the timeline sequences can vary from those shown in FIGS. 2-4, 8-9. In one embodiment, if the video tracks or video timeline sequences are edited, the corresponding audio tracks or audio timeline sequences may or may not be edited as well. So if an edit point is created between video clips, then corresponding audio clips can have edit points at the same edit point locations in the track or timeline sequence. The software program can provide a user with an option of whether to include an automatically updated audio arrangement that corresponds with the updated video arrangement. In some embodiments, the audio may automatically follow the video when the video is inserted into or deleted from the timeline sequence. In other embodiments, the audio may not follow the video, but may be inserted into or deleted from any of the tracks and/or timeline sequence. The tracks may have any number of video/audio clips, and the video/audio clips may be arranged in any order in the tracks. The implementation of the control panel may vary from the implementation described in FIGS. 6A-6B. For example, the controls for the control panel may be arranged in a different format or location. Also, the control panel may have controls for jumping ahead or back a predetermined amount of time, frames, or edit points. In some embodiments, the order of the recording and overwriting process may vary from the process shown in FIG. 7.

What is claimed is:

1. A method of recording video comprising:
    playing video from a timeline sequence, wherein the timeline sequence comprises footage from portions of video tracks, and wherein the timeline sequence includes at least one pre-recorded edit;
    in response to a selection of footage from the timeline sequence, overwriting the at least one pre-recorded edit in the timeline sequence, wherein the overwriting occurs while the video in the timeline sequence is playing; and
    in response to receiving a selection of a jump back input, automatically rewinding the playing video a pre-defined amount of time or frames, playing the video automatically after rewinding at a rewound location in the timeline sequence, and simultaneously overwriting the timeline sequence with the playing video beginning at the rewound location.

2. The method in accordance with claim 1, wherein the overwriting comprises overwriting while playing the video at a play rate faster than realtime, a play rate slower than realtime, a user-selected playing rate, during video scrubbing, or during realtime playback.

3. The method in accordance with claim 1, further comprising providing an option in the graphical user interface to re-overwrite the pre-recorded edit in the timeline sequence by rewinding the playing video a pre-defined amount of time or frames to position the playing video at a location before at least the one pre-recorded edit in the timeline sequence, and overwriting the pre-recorded edit in the timeline sequence with the playing video commencing at the rewound location.

4. The method in accordance with claim 1,
    displaying the playing video in a graphical user interface that includes punch-in and punch-out locations, wherein the punch-in location represents a location to overwrite the pre-recorded edit in the timeline sequence when the playing video reaches the punch-in location on the timeline sequence, and wherein the punch-out location represents a location to end the overwriting of the pre-recorded edit in the timeline sequence when the playing video reaches the punch-out location on the timeline sequence;
    wherein the overwriting comprises:
        overwriting in the timeline sequence when the playing video reaches the punch-in location, wherein the overwriting the at least one pre-recorded edit in the timeline sequence occurs when the at least one pre-recorded edit is on the punch-in location or between the punch-in and punch-out locations in the timeline sequence; and
        stopping the overwriting in the timeline sequence when the playing video reaches the punch-out location on the timeline sequence, and
    wherein the selecting comprises a selection of at least one monitor corresponding to a video track to overwrite the at least one pre-recorded edit in the timeline sequence.

5. A computer program product, encoded on a computer-readable medium, operable to cause data processing apparatus to perform operations comprising:
  playing video from a timeline sequence, wherein the timeline sequence comprises footage from portions of video tracks, wherein each video track corresponds to a respective camera in a multiple-camera source, and wherein the timeline sequence includes at least one pre-recorded edit;
  in response to a selection associated with the multiple-camera source, overwriting the at least one pre-recorded edit in the timeline sequence, wherein the overwriting occurs while the video from the timeline sequence is playing; and
  in response to receiving a selection of a jump back input, automatically rewinding the playing video a pre-defined amount of time or frames, playing the video automatically after rewinding at a rewound location in the timeline sequence, and simultaneously overwriting the timeline sequence with the playing video beginning at the rewound location.

6. The computer program product in accordance with claim 1, wherein the operations comprise concurrently presenting video from the timeline sequence and each of the video tracks in a distinct monitor of a plurality of monitors.

7. The computer program product in accordance with claim 6, wherein the selection associated with the multiple-camera source comprises a selection of at least one monitor corresponding to a video track to overwrite the at least one pre-recorded edit in the timeline sequence.

8. The computer program product in accordance with claim 1, wherein the overwriting occurs while playing the video in realtime.

9. The computer program product in accordance with claim 1, wherein the selection associated with the multiple-camera source comprises a selection of an overwrite selector to enable or disable overwriting.

10. The computer program product in accordance with claim 9, wherein the operations further comprise presenting a preview mode in a graphical user interface for displaying the timeline sequence when the overwrite selector disables overwriting.

11. The computer program product in accordance with claim 1, wherein the overwriting comprises operations to overwrite a video camera angle on the timeline sequence with a different video camera angle.

12. The computer program product in accordance with claim 1, wherein the operations further comprise:
  displaying the playing video in a graphical user interface that includes punch-in and punch-out locations, wherein the punch-in location represents a location to overwrite the pre-recorded edit in the timeline sequence when the playing video reaches the punch-in location on the timeline sequence, and wherein the punch-out location represents a location to end the overwriting of the pre-recorded edit in the timeline sequence when the playing video reaches the punch-out location on the timeline sequence;
  displaying a preview mode in the graphical user interface for the playing video corresponding to the punch-in and punch-out locations; and
  presenting a jump back input selector in the graphical user interface to receive the selection of the jump back input.

13. The computer program product in accordance with claim 1, wherein the playing comprises playing video from a target timeline sequence comprising the footage and a target video track, wherein the target video track comprises a source video timeline sequence including the video tracks corresponding to respective camera in a multiple-camera source, and wherein the footage comprises one or more video clips.

14. The computer program product in accordance with claim 13, wherein the selection associated with the multiple-camera source comprises a selection of footage from at least one of the cameras in the multiple-camera source.

15. The computer program product in accordance with claim 1, further comprising providing an option in a graphical user interface to re-overwrite at least one pre-recorded edit in the timeline sequence before the overwriting commences at the rewound location.

16. The computer program product in accordance with claim 1, wherein the rewinding comprises positioning the playing video at a location before at least one pre-recorded edit in the timeline sequence, and overwriting the timeline sequence with the playing video commencing at the location before the pre-recorded edit.

17. The computer program product in accordance with claim 1, wherein the playing of the video resumes immediately after the rewinding at the rewound location in the timeline sequence.

18. A system comprising:
  a graphical user interface configured to present:
    a first video track comprising a first footage;
    a first timeline sequence comprising at least some portions from a first set of video tracks, wherein the first set of video tracks comprises at least some portions of the first footage and footage from a plurality of video tracks other than the first footage
    a second timeline sequence comprising at least some portions from a second set of video tracks, wherein the second set of video tracks comprises at least some portions of the first timeline sequence; and
    a jump back selector;
    a plurality of monitors in the graphical user interface configured to concurrently display footage for any of the video tracks and timeline sequences, wherein at least one video track in at least the first timeline sequence corresponds to a distinct monitor in the plurality of monitors, and wherein at least one video track in at least the first set of video tracks corresponds with footage from a distinct camera in a multiple-camera video source;
    a monitor selector configured to process information for the graphical user interface, at least one of the plurality of monitors, or the monitor selector, and
    wherein the jump back input selector is configured to automatically rewind the playing video a predetermined amount of time or frames, play the video automatically after rewinding at a rewound location, and simultaneously re-overwrite at least one of the pre-recorded edits in at least one of the timeline sequences while the video is playing.

19. The system in accordance with claim 18, wherein at least one monitor is configured to display a preview of potential overwrites of the pre-recorded edits.

20. The system in accordance with claim 18, wherein upon the system receiving a selection of the jump back input selector, the system is configured to:
  position the playing video to a rewound location that is before at least one of the pre-recorded edits in the at least one timeline sequence; and
  overwrite the at least one pre-recorded edit in the timeline sequence with the playing video beginning at the rewound location.

21. The system in accordance with claim 18, wherein the system is further configured to display video in at least one monitor in the graphical user interface for punch-in and punch-out locations in the first or second timeline sequence, wherein the punch-in locations represent locations where the system is configured to overwrite the pre-recorded edits in the first or second timeline sequence when the playing video reaches the punch-in locations on the first or second timeline sequence, and wherein the punch-out locations represent locations where the system is configured to end the overwriting of the pre-recorded edits in the first or second timeline sequence when the playing video reaches the punch-out locations on the first or second timeline sequence, wherein the system is further configured to display video in a preview mode in the monitor in the graphical user interface for the punch-in and punch-out locations in the first or second timeline sequence, and wherein the system further comprises a recording selector to overwrite pre-recorded edits from at least some portions of any of the timeline sequences.

22. The system in accordance with claim 21, wherein when the recording selector is enabled, the recording selector is configured to create an edit location in at least one of the timeline sequences that is playing, wherein video in the at least one of the timeline sequences is overwritten at the edit location with footage from a selected monitor.

* * * * *

UNITED STATES PATENT AND TRADEMARK OFFICE
CERTIFICATE OF CORRECTION

| | | |
|---|---|---|
| PATENT NO. | : 7,823,056 B1 | |
| APPLICATION NO. | : 11/429134 | |
| DATED | : October 26, 2010 | |
| INVENTOR(S) | : Matthew Davey | |

It is certified that error appears in the above-identified patent and that said Letters Patent is hereby corrected as shown below:

In Column 19, lines 22-23, claim 6, delete "claim 1," and insert -- claim 5, --, therefor.

In Column 19, lines 31-32, claim 8, delete "claim 1," and insert -- claim 5, --, therefor.

In Column 19, lines 34-35, claim 9, delete "claim 1," and insert -- claim 5, --, therefor.

In Column 19, line 44, claim 11, delete "claim 1," and insert -- claim 5, --, therefor.

In Column 19, line 48, claim 12, delete "claim 1," and insert -- claim 5, --, therefor.

In Column 19, line 65, claim 13, delete "claim 1," and insert -- claim 5, --, therefor.

In Column 20, line 9, claim 15, delete "claim 1," and insert -- claim 5, --, therefor.

In Column 20, line 14, claim 16, delete "claim 1," and insert -- claim 5, --, therefor.

In Column 20, line 20, claim 17, delete "claim 1," and insert -- claim 5, --, therefor.

In Column 20, line 30, claim 18, delete "footage" and insert -- footage; --, therefor.

Signed and Sealed this
Fifteenth Day of March, 2011

David J. Kappos
*Director of the United States Patent and Trademark Office*